United States Patent Office 3,302,970
Patented Feb. 7, 1967

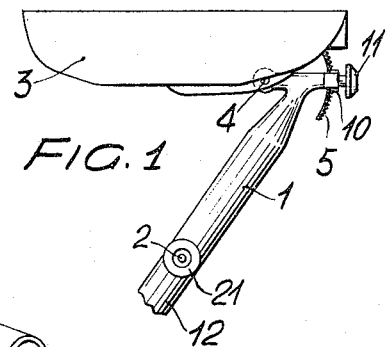
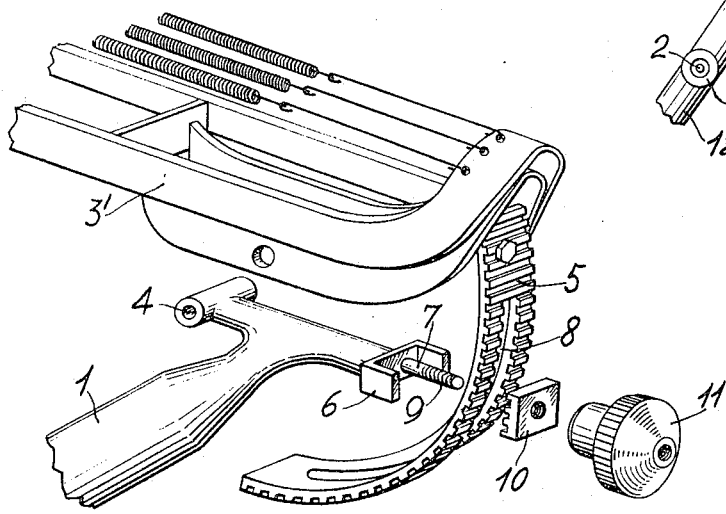
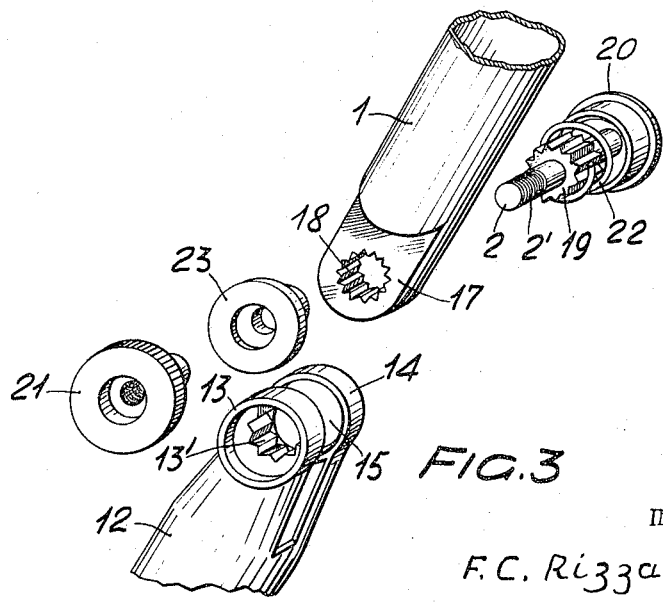

3,302,970
LOCKABLE JOINT DEVICE FOR A CYCLE SADDLE MOUNTED ON AN ORIENTABLE SADDLE-HOLDER
Francesco Cesare Rizzato, Padova, Italy
Filed July 22, 1965, Ser. No. 473,933
Claims priority, application Italy, Apr. 5, 1965, 7,567/65
8 Claims. (Cl. 297—195)

The problem for a jointed mounting of the saddle of some types of cycles has risen from the coming into use of orientable saddle-holders; consequently, saddle height is a function of saddle-holder orientation, namely, of adjusting saddle position so that, when orientated, it can be quickly brought into the desired horizontal plane.

In other words, the mutual rotations of saddle-holder pivot and that of saddle alow the latter to keep its horizontality, whatever may be the rotation caused to saddle-holder on pivoting point thereof. The object of the present invention is to provide a lockable joint device for a cycle saddle mounted on an orientable saddle-holder in order to readily and easily compensate for angular displacements of saddle-holder and assure horizontal position of the saddle, whatever the saddle-holder position may be, the invention being characterized in that saddle-holder pivoting is axially adjustable and lockable, whereas saddle pivoting is adjustable remote from centre of oscillation by means of a thread block operating an arcuate rack integral with the saddle.

These details of construction are particularly required and appreciated in cycle types having a general character that can fit the bicyclist's body.

In the appended drawings:
FIGURE 1 is a schematic side view of a saddle and saddle-holder;
FIGURE 2 shows the details of the saddle pivoting control and
FIGURE 3 shows the details of the saddle-holder pivoting.

As seen in FIGURE 1, saddle-holder 1 is pivoted on pin 2, whereas saddle 3 is mounted on pivoting 4.

FIGURE 2, showing a detail A of FIGURE 1 on an enlarged scale, illustrates how casing 3' of saddle 3 carries at one end thereof a toothed sector 5 provided with a longitudinal slot 8 slidable within a guide 6, said guide being located opposite the pin guide 4 with respect to the saddle-holder rod 1. A threaded stem 7, centrally secured to guide 6, can slide freely within slot 8 of toothed sector 5, so that the threaded end 9 of the above stem 7 projects from through slot 8. A toothed plug 10, having a central through bore and toothing quite similar to sector 5, is inserted in stem 7, thus being forced against toothing 5 of sector by threaded knob 11.

It is apparent that by loosening knob 11 to such an extent as to allow toothed plug 10 to project from toothing of sector 5, swinging of saddle 3 and adjustment thereof in the desired location will be possible; then the position will be secured by merely screwing knob 11.

FIGURE 3 shows the pivoting of saddle-holder rod 1. At the end of rear prong 12 of the cycle there is applied a double bush 13–14, bush 13 being internally provided with toothing 13'. Between the two bushes 13 and 14 there is a gap 15, in which saddle-holder appendix 17 is inserted, said appendix being also provided with a toothed bore 18 quite identical to bore 13' of bush 13. Appendix 17 has a flat shape and thickness thereof is less than total thickness of saddle-holder 1.

Pin 2 has a thread 2' and is integral with a sprocket 19, whose toothing is similar and engageable in the internal toothings 13' and 18, and terminates in a head 20, acting to operate pin 2 and to mesh sprocket 19 in the two toothed seatings 13'–18 when thoroughly forced, being thereafter secured by screwing threaded knob 21 on thread 2' of pin 2 and resisting action of spring 22.

Thus, by merely unscrewing knob 21, under the action of counter spring 22, a pin 2 leaves central seating 13' with its sprocket 19. However, pin 2 remains integral with saddle-holder appendix 17 and carries out angular displacements of the latter being guided by connection of its head 20 with bush 14.

At the other end said movements are guided by abutment 23, that fits into the untoothed portion of bush 13.

The desired angle position of saddle-holder 1 relative to rear prong 12 being attained, knob 21 is re-screwed, thus locking the whole set.

Eventual variants do not limit the invention provided that they have the disclosed operation.

What is claimed is:

1. In the combination of a bicycle saddle and an orientable saddle-holder therefor, a lockable joint comprising a pivot axially adjustable and lockable upon said saddle-holder, said saddle being pivoted on said saddle-holder, a saddle pivot adjustable remote from its centre of oscillation, an arcuate rack integral with the saddle and a block device integral with the saddle-holder operating on said arcuate rack for adjusting the saddle position in relation to the position of the saddle-holder, said arcuate rack being located in a vertical plane and provided with a longitudinal slot, further having one end fixedly mounted on the rear part of the saddle and the other end free, said saddle-holder being T-shaped, the saddle being pivoted at the end of one arm of T, while said block device comprises a threaded spoke on the other arm of T sliding in the rack slot and a U-guide for the rack, a threaded knob cooperating with the above mentioned parts for blocking the saddle rack in relation to the frame.

2. In the combination of a bicycle saddle and an orientable saddle-holder therefor, a lockable joint comprising a pivot axially adjustable and lockable upon said saddle-holder, said saddle being pivoted on said saddle-holder, a saddle pivot adjustable remote from its centre of oscillation, an arcuate rack integral with the saddle and a block device integral with the saddle-holder and operating on said arcuate rack for adjusting the saddle position in relation to the position of the saddle-holder, the pivoting of the saddle-holder comprising a pair of co-axial bushes, horizontally spaced apart and arranged at the ends of the cycle rear prong, one of said bushes being provided with a smooth cylindrical zone, and with an internally toothed band, a flat saddle-holder appendix to be inserted between the two bushes, said appendix being provided with an internally toothed bore similar to bush bore, said bores having the purpose of receiving a sprocket keyed on the joint pin, a handwheel nut screw to be screwed on the threaded end of said pin.

3. In the combination of a bicycle saddle and an orientable saddle-holder therefor, a lockable joint comprising a pivot axially adjustable and lockable upon said saddle holder, said saddle being pivoted on said saddle holder, a saddle pivot adjustable remote from its centre of oscillation, an arcuate rack integral with the saddle and a block device integral with the saddle-holder operating on said arcuate rack for adjusting the saddle position in relation to the position of the saddle-holder, the pivoting of the saddle-holder comprising a pair of co-axial bushes, horizontally spaced apart and arranged at the ends of the cycle rear prong, one of said bushes provided with a smooth cylindrical zone, and with an internally toothed band, a flat saddle-holder appendix to be inserted between the two bushes, said appendix being provided with an internally toothed bore similar to bush bore, said bores having the purpose of receiving a sprocket keyed on the joint pin, a handwheel nut screw to be screwed on the threaded end of said pin, and a spring wound on the pivot of the saddle holder, causing this pivot sprocket to project from bush toothing; so as to allow rotations of the saddle-holder for its adjusting.

4. In the combination of a saddle and holder therefor, a lockable joint comprising means carried by said holder and spaced from said saddle for swinging the portion of said holder located between said means and said saddle and for locking said holder portion, a pivot supporting said saddle and carried on top of said holder and to one side thereof, an arcuate rack carried by said saddle and extending in the opposite side of said holder, and means carried by said holder for locking said rack.

5. In the combination of a saddle and holder therefor, a lockable joint comprising means carried by said holder and spaced from said saddle for swinging the portion of said holder located between said means and said saddle and for locking said holder portion, said holder portion having a T-shaped top having ends extending on opposite sides of the holder, a pivot carried by one of said ends and carrying said saddle, an arcuate rack carried by said saddle and extending adjacent the other one of said ends, a U-shaped guide carried by said other end and enclosing said rack, said rack having a longitudinal slot, a pin carried by said U-shaped guide and extending through said slot, and means connected with said pin for locking said rack.

6. A lockable joint in accordance with claim 5, wherein the last-mentioned means comprise a plug having teeth adapted to engage the teeth of said rack, said plug having an opening through which said pin extends, said pin having a threaded outer portion, and a threaded knob meshing with the threaded portion of said pin.

7. In the combination of a saddle and holder therefor, a lockable joint comprising two spaced coxial bushes integral with said holder and located intermediate the ends of said holder, one of said bushes having inner teeth, said holder having a portion fitting between said bushes and having an opening with inner teeth similar to the first-mentioned teeth, a pin extending through said bushes and said opening, a sprocket keyed upon said pin and meshing with the first-mentioned and the second-mentioned teeth, said pin having a threaded outer portion, a threaded knob meshing with the threaded portion of said pin, a pivot supporting said saddle and carried on top of said holder and to one side thereof, an arcuate rack carried by said saddle and extending on the opposite side of said holder, and means carried by said holder for locking said rack.

8. A lockable joint in accordance with claim 7, further comprising a helical spring engaging said sprocket and said knob.

References Cited by the Examiner

UNITED STATES PATENTS

| 401,110 | 4/1889 | Bardsley | 108—9 |
| 507,514 | 8/1893 | Warwick | 297—204 |
| 540,431 | 6/1895 | Garford | 297—204 |
| 1,262,468 | 4/1918 | Drapalik | 108—94 |
| 3,092,362 | 6/1963 | Walsh | 248—291 |

FOREIGN PATENTS

| 936,683 | 2/1948 | France. |
| 969,277 | 5/1950 | France. |
| 84,254 | 9/1935 | Sweden. |

FRANK B. SHERRY, *Primary Examiner.*

J. T. McCALL, *Assistant Examiner.*